United States Patent Office 2,922,791
Patented Jan. 26, 1960

2,922,791

CERTAIN PYRIDINE-2-DITHIOPHOSPHONATE, N-OXIDES

Jack Rockett, Metuchen, N.J., assignor to Olin Mathieson Chemical Corporation, New Haven, Conn., a corporation of Virginia No Drawing. Application January 6, 1958
Serial No. 707,098

4 Claims. (Cl. 260—294.8)

This invention relates to a new group of chemical compounds and to processes for their preparation. More particularly, this invention relates to new and useful derivatives of 2-mercaptopyridine-1-oxide.

The compounds of this invention are represented by the following general formula:

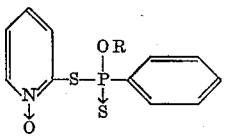

wherein R is an alkyl group having from one to eighteen carbon atoms. Representative examples of alkyl groups contemplated for use in the compounds of the present invention are methyl, ethyl, butyl, isobutyl, propyl, isopropyl, amyl, hexyl, octyl, decyl, dodecyl, and octadecyl groups.

It has been found that compounds of the general formula display biological activity and, more particularly, that the compounds of the present invention possess pesticidal properties. They have been found to have activity as insecticides and as agricultural fungicides for use in the treatment of soils or of plant foliage and as such can serve a dual pest control purpose with a single application. They can be employed in any of usual forms for the administration or application of pesticides. For example, they can be used as solid compositions, admixed with an inert, solid diluent, such as talc. They can also be employed in emulsion or in solution form.

The compounds of this invention can be prepared by the following reaction sequence:

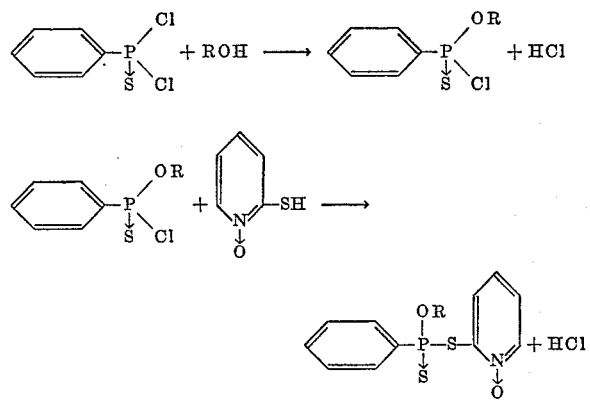

In the above reaction, an aliphatic alcohol is reacted with benzene phosphorus thiodichloride in a suitable inert solvent medium, such as benzene, and in the presence of an acid binding agent, such as pyridine. The product of this reaction is then, without isolation from the reaction medium, condensed with 2-mercaptopyridine-1-oxide, to form the desired O-alkyl-S-(2-pyridyl-1-oxide) benzene dithiophosphonate.

The compound referred to herein as 2-mercaptopyridine-1-oxide, although generally represented as:

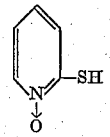

is more accurately represented as a tautomer of two possible structures, as follows:

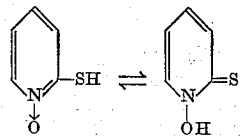

While only benzene has been specifically mentioned for use as the reaction medium, it is obvious that other inert solvents, such as toluene, can be employed for this purpose. It is desirable that an acid binding agent, i.e. a substance which will combine with the hydrogen halide liberated in the course of the reaction, be employed in order to prevent the hydrogen halide from interfering with the desired reaction. While pyridine is preferred for use, other basic compounds such as sodium carbonate, dimethyl aniline or quinoline can be employed.

The aliphatic alcohol reactant of the first step of the reaction sequence can be any aliphatic alcohol having from 1 to 18 carbon atoms. Representative examples of suitable alcohols are methyl, ethyl, butyl, isobutyl, propyl, isopropyl, amyl, hexyl, decyl. dodecyl and octadecyl alcohols.

The syntheses of the compounds of the present invention are more fully disclosed in the following specific examples which are for purposes of illustration only and are not to be construed as limiting the present invention, the scope of which is defined in the appended claims.

*Example I*

In a flask was placed 42.2 g. (0.2 mole) of benzene phosphorus thiodichloride and 100 cc. of benzene. To it was added, dropwise, a solution of 6.4 g. (0.2 mole) of methanol, 15.8 g. (0.2 mole) of pyridine, and 80 cc. of benzene. After the addition was completed, the solution was stirred for two hours. A solution of 25.4 g. (0.2 mole) of 2-mercaptopyridine-1-oxide, 15.8 g. (0.2 mole) of pyridine and 150 cc. of benzene was then added dropwise. The temperature rose to 39°. The flask contents were filtered and the filtrate was washed with cold water. The benzene was distilled at reduced pressure leaving 53.2 g. of O-methyl-S-(2-pyridyl-1-oxide) benzene dithiophosphonate, a red oil. This represented an 89.7% yield.

*Example II*

In a three necked flask was placed a solution of 42.2 g. (0.2 mole) of benzene phosphorus thiodichloride and 100 cc. of benzene. To it was added, dropwise, a solution of 9.2 g. (0.2 mole) of ethanol, 15.8 g. (0.2 mole) of pyridine, and 50 cc. of benzene. A cooling bath was used to keep the temperature between 20–30°. When this operation was completed, a solution of 25.4 g. (0.2 mole) of 2-mercaptopyridine-1-oxide, 15.8 g. (0.2 mole) of pyridine, and 100 cc. of benzene was added dropwise. The flask was heated to 50–55° for two hours and cooled. The reaction product was filtered and the filtrate was washed with cold water. The benzene was distilled leaving 63.3 g. of O-ethyl-S-(2-pyridyl-1-oxide) benzene dithiophosphonate, a deep amber colored oil, a quantitative yield.

The compounds of this invention are adapted to be employed for the control of various pests, particularly of agricultural pests. The compounds, which in most cases are liquids, may be dispersed on an inert finely divided solid and employed as a dust. Suitable solid carriers are clay, talc, bentonite, as well as other carriers known in the art (see Frear, "Chemistry of Insecticides, Fungicides and Herbicides"). Alternately, the compounds may be applied as a spray in a liquid carrier either as a solution in a solvent or as a suspension in a non-solvent such as water. When applied as a suspension it may be desirable to incorporate wetting agents. The compounds of this invention may also be admixed with carriers that are themselves active, such as other parasiticides, herbicides and fertilizers.

Foliage fungicide tests, as described in "Phytopathology," volume 33, pages 627–632 (1943), and volume 37, pages 354–356 (1947), showed that concentrations of somewhat less than 25 parts per million of the compounds of Examples I and II were effective for the inhibition of the germination of 50% of the spore of *Monolinia fructicola*, an organism which causes brown rot of stone fruits.

The compounds of the present invention have also shown insecticidal properties. Thus, the compound of Example II provided good control on mites and aphids when used at 0.1% concentration.

The results of the tests referred to above indicate the utility of the novel compounds of this invention as biologically active agents, particularly as displaying useful fungicidal and insecticidal properties.

The invention having been disclosed, what is believed to be new and desired to be secured by Letters Patent is:

1. A compound of the formula:

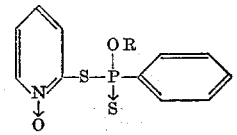

wherein R is an alkyl radical having from 1 to 18 carbon atoms.

2. O-methyl-S-(2-pyridyl-1-oxide) benzene dithiophosphonate.

3. O-ethyl-S-(2-pyridyl-1-oxide) benzene dithiophosphonate.

4. A process for the preparation of a compound having the formula:

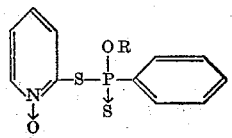

wherein R is an alkyl radical having from 1 to 18 carbon atoms which comprises reacting an aliphatic alcohol with benzene phosphorus thiodichloride, condensing the resultant reaction product with 2-mercaptopyridine-1-oxide, and recovering the product.

References Cited in the file of this patent

UNITED STATES PATENTS

| | | |
|---|---|---|
| 2,503,390 | Jelinek | Apr. 11, 1950 |
| 2,686,786 | Shaw | Aug. 17, 1954 |

FOREIGN PATENTS

| | | |
|---|---|---|
| 666,596 | Great Britain | Feb. 13, 1953 |